United States Patent
Iyer et al.

(10) Patent No.: US 11,671,521 B2
(45) Date of Patent: Jun. 6, 2023

(54) ETHERNET INTERFACE AND RELATED SYSTEMS, METHODS AND DEVICES

(71) Applicant: Microchip Technology Incorporated, Chandler, AZ (US)

(72) Inventors: Venkatraman Iyer, Austin, TX (US); Dixon Chen, Shenzhen (CN); John Junling Zang, Shenzhen (CN); Shivanand I. Akkihal, Austin, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/684,428

(22) Filed: Nov. 14, 2019

(65) Prior Publication Data
US 2021/0058498 A1   Feb. 25, 2021

(30) Foreign Application Priority Data

Aug. 23, 2019 (CN) .................. 201910785140.7

(51) Int. Cl.
*H04L 69/323* (2022.01)
*H04L 7/00* (2006.01)
*H04L 47/22* (2022.01)
*H04L 69/329* (2022.01)

(52) U.S. Cl.
CPC .......... *H04L 69/323* (2013.01); *H04L 7/0016* (2013.01); *H04L 47/22* (2013.01); *H04L 69/329* (2013.01)

(58) Field of Classification Search
CPC .................................................. H04L 69/323
See application file for complete search history.

(56) References Cited

U.S. PATENT DOCUMENTS

| | | |
|---|---|---|
| 4,739,276 A | 4/1988 | Graube |
| 4,970,466 A | 11/1990 | Bolles et al. |
| 5,134,377 A | 7/1992 | Reddy et al. |
| 5,305,459 A | 4/1994 | Rydel |
| 5,357,145 A | 10/1994 | Segaram |
| 5,381,348 A | 1/1995 | Ernst et al. |
| 5,581,556 A | 12/1996 | Ohie |

(Continued)

FOREIGN PATENT DOCUMENTS

| | | |
|---|---|---|
| CN | 101127928 A | 2/2008 |
| CN | 101616048 A | 12/2009 |

(Continued)

OTHER PUBLICATIONS

International Search Report from International Application No. PCT/US2020/0070367, dated Oct. 27, 2020, 5 pages.

(Continued)

*Primary Examiner* — Abdeltif Ajid
(74) *Attorney, Agent, or Firm* — TraskBritt

(57) ABSTRACT

Disclosed embodiments relate, generally, to improved data reception handling at a physical layer (PHY). Some embodiments relate to end of line systems that include legacy media access control (MAC) and PHY that implement improved data reception handling disclosed herein. The improved data reception handling improves the operation of the end of line systems, and the MAC more specifically, and in some cases to comply with media access tuning protocols implemented at the physical layer.

23 Claims, 4 Drawing Sheets

(56) References Cited

U.S. PATENT DOCUMENTS

| | | | |
|---|---|---|---|
| 5,784,573 A | 7/1998 | Szczepanek et al. | |
| 5,859,554 A | 1/1999 | Higashisaka et al. | |
| 5,892,893 A | 4/1999 | Hanf et al. | |
| 6,029,202 A | 2/2000 | Frazier et al. | |
| 6,115,831 A | 9/2000 | Hanf et al. | |
| 6,192,422 B1 | 2/2001 | Daines et al. | |
| 6,215,816 B1 | 4/2001 | Gillespie et al. | |
| 6,459,739 B1 | 10/2002 | Vitenberg | |
| 6,463,543 B1 | 10/2002 | Alvarez | |
| 6,479,983 B1 | 11/2002 | Ebiya | |
| 6,691,241 B1 | 2/2004 | Taylor | |
| 6,735,217 B1 | 5/2004 | Webber, Jr. et al. | |
| 6,920,132 B1 | 7/2005 | Lo | |
| 6,973,094 B1 | 12/2005 | Holloway et al. | |
| 7,110,423 B1 | 9/2006 | Sethuram | |
| 7,558,348 B1 | 7/2009 | Liu et al. | |
| 7,906,973 B1 | 3/2011 | Orr | |
| 8,243,752 B2* | 8/2012 | Barkan | H04L 47/22 370/476 |
| 8,935,125 B1 | 1/2015 | Fu et al. | |
| 9,454,212 B1 | 9/2016 | Schulze | |
| 9,628,082 B1 | 4/2017 | Smith et al. | |
| 9,696,361 B1 | 7/2017 | Sun et al. | |
| 10,684,977 B1 | 6/2020 | Seger et al. | |
| 10,863,386 B1 | 12/2020 | Anand et al. | |
| 11,218,964 B2 | 1/2022 | Chae et al. | |
| 2002/0162038 A1 | 10/2002 | Bullman et al. | |
| 2003/0061341 A1 | 3/2003 | Loh et al. | |
| 2003/0126486 A1 | 7/2003 | Bui | |
| 2003/0200306 A1 | 10/2003 | Park et al. | |
| 2003/0225802 A1 | 12/2003 | Ruthstein et al. | |
| 2004/0028164 A1 | 2/2004 | Jiang et al. | |
| 2004/0145500 A1 | 7/2004 | Huebl | |
| 2004/0240598 A1 | 12/2004 | Guangming | |
| 2004/0251912 A1 | 12/2004 | Pharn et al. | |
| 2005/0063116 A1 | 3/2005 | Rotheroe | |
| 2005/0078683 A1 | 4/2005 | Page | |
| 2005/0128826 A1 | 6/2005 | Kwack et al. | |
| 2006/0109784 A1 | 5/2006 | Weller et al. | |
| 2006/0181283 A1 | 8/2006 | Wajcer et al. | |
| 2006/0209710 A1 | 9/2006 | Watanabe | |
| 2007/0008011 A1 | 1/2007 | Thurston | |
| 2007/0121624 A1 | 5/2007 | Kimbrough et al. | |
| 2007/0133586 A1 | 6/2007 | Ojard et al. | |
| 2007/0160087 A1 | 7/2007 | Findlater et al. | |
| 2008/0024178 A1 | 1/2008 | Kim et al. | |
| 2008/0037693 A1 | 2/2008 | Andrus et al. | |
| 2008/0117810 A1 | 5/2008 | Stott et al. | |
| 2008/0159330 A1 | 7/2008 | Deng et al. | |
| 2008/0162682 A1 | 7/2008 | Ramachandran et al. | |
| 2008/0186996 A1 | 8/2008 | Powell et al. | |
| 2009/0003835 A1 | 1/2009 | Arahira | |
| 2009/0201936 A1* | 8/2009 | Dumet | H04L 9/40 370/503 |
| 2010/0202436 A1 | 8/2010 | Albert et al. | |
| 2011/0022699 A1 | 1/2011 | Powell et al. | |
| 2011/0170476 A1 | 7/2011 | Shapira et al. | |
| 2012/0087662 A1 | 4/2012 | Suzuki et al. | |
| 2012/0155476 A1 | 6/2012 | Pavani et al. | |
| 2012/0229214 A1 | 9/2012 | Kasanyal | |
| 2012/0307637 A1 | 12/2012 | Diab | |
| 2013/0007480 A1 | 1/2013 | Wertheimer et al. | |
| 2013/0021063 A1 | 1/2013 | Kwon | |
| 2013/0101058 A1 | 4/2013 | Hummel | |
| 2013/0159489 A1 | 6/2013 | Cha et al. | |
| 2013/0229926 A1 | 9/2013 | Lu et al. | |
| 2013/0329773 A1 | 12/2013 | Cheng et al. | |
| 2014/0073352 A1 | 3/2014 | Aldana et al. | |
| 2014/0177653 A1 | 6/2014 | Tzeng | |
| 2014/0268141 A1 | 9/2014 | Pariseau | |
| 2014/0281626 A1 | 9/2014 | Younger et al. | |
| 2015/0063375 A1* | 3/2015 | Tzeng | H04J 3/0667 370/512 |
| 2015/0124797 A1 | 5/2015 | Babitch et al. | |
| 2015/0131708 A1 | 5/2015 | Cornett et al. | |
| 2015/0145563 A1 | 5/2015 | Pardoen | |
| 2015/0145581 A1 | 5/2015 | Palmer et al. | |
| 2015/0205339 A1 | 7/2015 | Park et al. | |
| 2015/0237178 A1 | 8/2015 | Zhang | |
| 2015/0370312 A1 | 12/2015 | Desposito et al. | |
| 2016/0094362 A1 | 3/2016 | Brennan | |
| 2016/0323287 A1 | 11/2016 | Kishikawa et al. | |
| 2016/0337138 A1 | 11/2016 | Gardner et al. | |
| 2017/0046298 A1* | 2/2017 | Yu | G06F 13/4226 |
| 2017/0111069 A1 | 4/2017 | Dafesh et al. | |
| 2018/0034658 A1 | 2/2018 | Kinage et al. | |
| 2018/0165056 A1 | 6/2018 | Lay et al. | |
| 2018/0181525 A1* | 6/2018 | Iyer | G06F 13/382 |
| 2018/0262526 A1 | 9/2018 | Wang et al. | |
| 2018/0314285 A1 | 11/2018 | Susanto et al. | |
| 2019/0179398 A1 | 6/2019 | Arora et al. | |
| 2019/0199537 A1 | 6/2019 | Seo et al. | |
| 2019/0230705 A1* | 7/2019 | Beruto | H04W 74/085 |
| 2019/0261420 A1 | 8/2019 | Axer et al. | |
| 2019/0268941 A1 | 8/2019 | Axer et al. | |
| 2019/0313446 A1 | 10/2019 | Kim et al. | |
| 2019/0357146 A1 | 11/2019 | Kim et al. | |
| 2019/0361711 A1 | 11/2019 | Kim et al. | |
| 2019/0363991 A1 | 11/2019 | Sostawa et al. | |
| 2019/0385057 A1 | 12/2019 | Litichever et al. | |
| 2020/0136993 A1 | 4/2020 | Yun et al. | |
| 2020/0153174 A1 | 5/2020 | Curtis et al. | |
| 2020/0295957 A1 | 9/2020 | Kim et al. | |
| 2020/0343993 A1 | 10/2020 | Rentschler et al. | |
| 2020/0351943 A1 | 11/2020 | Iyer et al. | |
| 2020/0367096 A1 | 11/2020 | Hwang et al. | |
| 2020/0371579 A1* | 11/2020 | Selvam | G06F 13/4295 |
| 2021/0282087 A1 | 9/2021 | Den Besten | |
| 2022/0046114 A1 | 2/2022 | Entelis et al. | |

FOREIGN PATENT DOCUMENTS

| | | |
|---|---|---|
| CN | 1866803 B | 5/2012 |
| DE | 102018105007 A1 | 9/2019 |
| EP | 0620664 | 10/1994 |
| EP | 1388975 A1 | 2/2004 |
| EP | 1940086 A1 | 7/2008 |
| EP | 3094044 A1 | 11/2016 |
| EP | 3573287 A1 | 11/2019 |
| EP | 3618364 A1 | 3/2020 |

OTHER PUBLICATIONS

International Written Opinion from International Application No. PCT/US2020/0070367, dated Oct. 27, 2020, 5 pages.

LAN/MAN Standards Committee of the IEEE Computer Society, "Draft Standard for Ethernet Amendment: Physical Layer Specifications and Management Parameters for 10 Mb/s Operation and Associated Power Delivery over a Single Balanced Pair of Conductors," IEEE Draft, P802.3cg/D2.4, Feb. 21, 2019, The Institute of Electrical and Electronics Engineers, Inc., pp. 1-60, New York.

Meier, "Analysis of Worst Case Latencies in an 10 Mbit Ethernet network with PLCA", IEEE Draft, V4, Jan. 17, 2018, pp. 1-11.

Pannell et al., "Quality of Service for PLCA", NXP, May 2018 (May 24, 2018), pp. 1-37, vol. 802.1, No. v02 24, Pittsburg.

U.S. Appl. No. 16/587,505, filed Sep. 30, 2019, titled "Detecting Collisions On A Network", to Zang et al., 34 pages.

U.S. Appl. No. 16/587,583, filed Sep. 30, 2019, titled "Interface For Improved Media Access, And Related Systems, Methods, And Devices", to Chen et al., 51 pages.

U.S. Appl. No. 16/588,562, filed Sep. 30, 2019, titled "Transceiver And Driver Architecture With Low Emission And High Interference Tolerance", to An et al., 36 pages.

U.S. Appl. No. 16/588,714, filed Sep. 30, 2019, titled "Diagnosing Cable Faults Within A Network", to Zang et al., 40 pages.

U.S. Appl. No. 16/591,294, filed Oct. 2, 2019, titled "Wake Detection At Controller For Physical Layer Of Single Pair Ethernet Network, And Related Systems, Methods And Devices", to An et al., 31 pages.

U.S. Appl. No. 16/653,688, filed Oct. 15, 2019, titled "Physical Layer To Link Layer Interface And Related Systems, Methods And Devices", to Iyer et al., 32 pages.

(56) References Cited

OTHER PUBLICATIONS

U.S. Appl. No. 16/684,419, filed Nov. 14, 2019, titled "Ethernet Interface And Related Systems Methods And Devices", to Iyer et al., 23 pages.

U.S. Appl. No. 62/881,720, filed Aug. 1, 2019, titled "Single Pair Ethernet Physical Layer Architecture And Systems, Devices, And Methods For Implementing the Same", to Iyer et al., 35 pages.

U.S. Appl. No. 62/993,825, filed Mar. 24, 2020, titled "Low Pin Count Handshake Signaling Protocol According To 10BASE-T1X Local And Remote Wake Detect And Related Systems, Methods, And Devices", to Iyer et al., 13 pages.

Fitzgerald: "10BASE-T1L Low Power Idle (802.3cg D2.0)", IEEE—SA, Acuitas Silicon, (Aug. 15, 2018) 9 pages.

Microchip KSZ8061MNX/MNG, "100BASE-T/100BASE-TX Physical Layer Transceiver" Device Document 00002038D (Aug. 15, 2018) 66 pages.

Microsoft. "P." Microsoft Computer Dictionary, 5th ed., Penguin Books, 2002. (Year: 2002).

\* cited by examiner

ETHERNET INTERFACE AND RELATED SYSTEMS, METHODS AND DEVICES

PRIORITY CLAIM

This application claims the benefit of the filing date of Chinese Provisional Patent Application Serial No. 201910785140.7, filed Aug. 23, 2019, for "ETHERNET INTERFACE AND RELATED SYSTEMS METHODS AND DEVICES."

TECHNICAL FIELD

Disclosed embodiments relate, generally, to Ethernet, and more specifically, some embodiments relate to Ethernet interfaces.

BACKGROUND

Interconnects are widely used to facilitate communication among devices of a network. Generally speaking, electrical signals are transmitted on a physical medium (e.g., a bus, a coaxial cable, or a twisted pair—but generally referred to simply as a "line") by the devices coupled to the physical medium.

According to the Open Systems Interconnection model (OSI model), Ethernet-based computer networking technologies use baseband transmission (i.e., electrical signals are discrete electrical pulses) to transmit data packets and ultimately messages that are communicated among network devices. According to the OSI model, specialized circuitry called a physical layer (PHY) device or controller is used to interface between an analog domain of a line and a digital domain of a data link layer (also referred to herein simply as a "link layer") that operates according to packet signaling. While the data link layer may include one or more sublayers, in Ethernet-based computer networking, a data link layer typically includes at least a media access control (MAC) layer that provides control abstraction of the physical layer. By way of example, when transmitting data to another device on a network, a MAC controller may prepare frames for the physical medium, add error correction elements, and implement collision avoidance. Further, when receiving data from another device, a MAC controller may ensure integrity of received data and prepare frames for higher layers.

There are various network topologies that implement physical layers and link layers (and may include other layers, without limitation). The Peripheral Component interconnect (PCI) standard and the Parallel Advanced Technology Attachment (Parallel ATA), both around since the early 1990s, may implement a multi-drop bus topology. The trend since the early 2000s has been to use point-to-point bus topologies, for example, the PCI Express standard and the Serial ATA (SATA) standard implement point-to-point topologies.

A typical point-to-point bus topology may implement lines between each device (e.g., dedicated point-to-point) or lines between devices and switches (e.g., switched point-to-point, without limitation). In a multi-drop topology, a physical medium is a shared bus and each network device is coupled to the shared bus, for example, via a circuit chosen based on the type of physical medium (e.g., coaxial or twisted pair, without limitation).

Point-to-point bus topologies, such as a dedicated point-to-point topology or a switched point-to-point topology, require more wires and more expensive material than multi-drop topologies due, in part, to the greater number of links between devices. In certain applications, such as automotive, there may be physical constraints that make it difficult to directly connect devices, and so a topology that does not require, or does not require as many, direct connections (e.g., a multi-drop topology, without limitation) in a network or a sub-network may be less susceptible to such constraints.

Devices that are on a baseband network (e.g., a multi-drop network without limitation) share the same physical transmission medium, and a typically use the entire bandwidth of that medium for transmission (stated another way, a digital Signal used in baseband transmission occupies the entire bandwidth of the media). As a result, only one device on a baseband network may transmit at a given instant. So, media access control methods are used to handle contention for a shared transmission medium.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
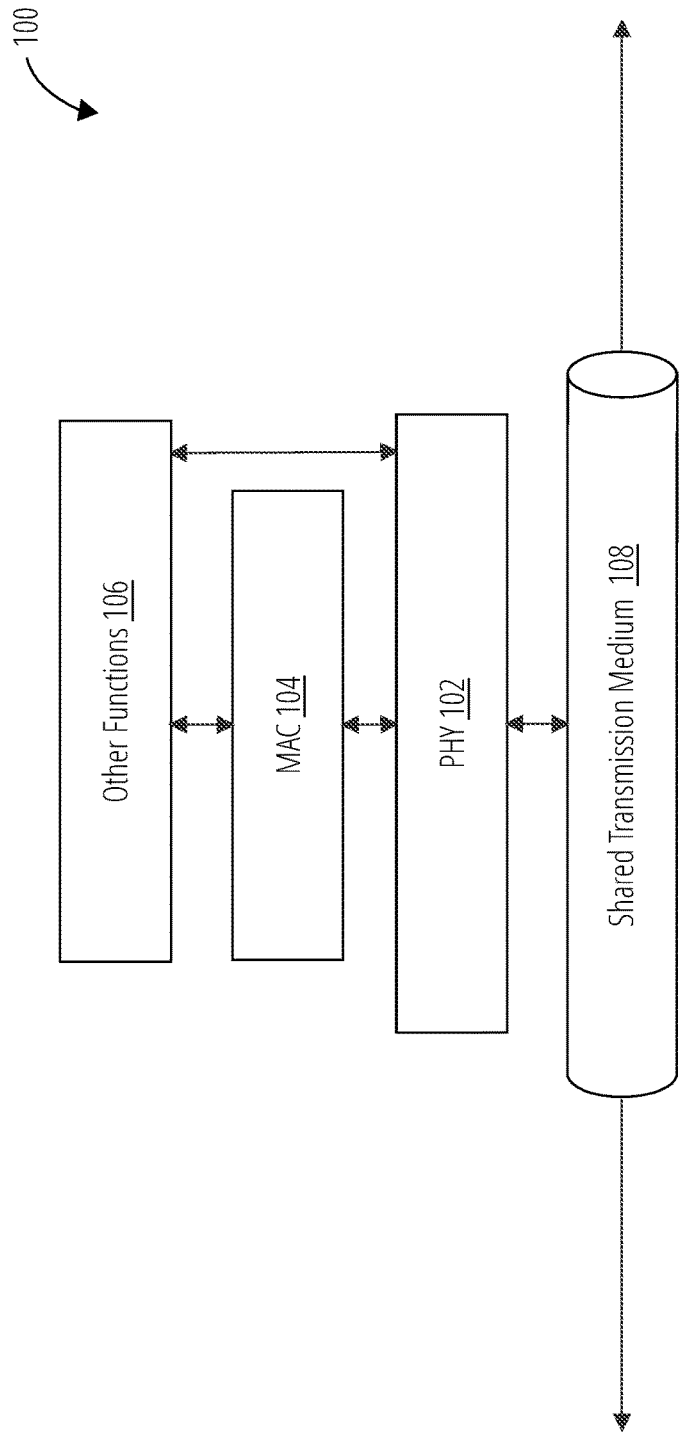
FIG. 1 illustrates a network segment in accordance with one or more embodiments.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, and symbols that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

The various illustrative logical blocks, modules, and circuits described in connection with the embodiments disclosed herein may be implemented or performed with a general purpose processor, a special purpose processor, a Digital signal Processor (DSP), an Application Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

In disclosed embodiments, unless otherwise stated a collision should be understood to refer to a logical collision (i.e., an actual collision is predicted but two or more nodes do not actually transmit signals on a shared transmission medium at the same time).

Protocols may be performed at a physical layer for media access tuning. For example, 10SPE (i.e., 10 Mbps Single Pair Ethernet) is a network technology specification currently under development by the Institution of Electrical and Electronics Engineers (IEEE) as IEEE 802.3cg™, and the 10SPE specification includes an optional physical layer collision avoidance (PLCA) reconciliation sublayer, which, in theory, may be used to avoid collisions on a multi-drop bus.

Other media access tuning protocols may be implemented in a PHY including time aware protocols and traffic shaping protocols. Generally speaking, time aware protocols are protocols where media access is granted or withheld for periods of time according to a schedule or by a scheduler using a schedule. Generally speaking, traffic shaping protocols are protocols where media access granted or withheld (alternatively or in addition to collision avoidance and/or time aware protocols) based, at least in part, on performance levels, quality of service, or return on investment. Traffic shaping may involve, as a non-limiting example, prioritizing types of traffic or types of traffic streams (e.g., time sensitive data, best effort data, and low-priority or no priority data, without limitation).

Generally speaking, interfaces between a PHY and a MAC (e.g., Media Independent interface (MII) or Reduced Media Independent interface (RMII), without limitation) specify specific signals that are sent between the devices. To comply with these specifications, devices (e.g., microchips and microcontrollers, without limitation) implementing a PHY or a MAC will typically include pins that are assigned to the specified signals. For example, an MII PHY may include, among other pins, pins for signaling valid receive data (RXDV), for signaling carrier activity (CRS), for signaling valid transmit data (TX_EN), a receive reference clock (RX_CLK), a transmit reference clock (TX_CLK), and for signaling management data (MDIO), in addition to pins for data lines for receive data (RXD) and transmit data (TXD). Depending on an implementation, respective input and output pins of a PHY and MAC may be assigned for exclusive signaling one of these signals, or non-exclusively signaling two or more of these signals.

The inventors of this disclosure appreciate a need for signaling between a MAC and a PHY, a controller and a PHY, or just other devices in a network protocol stack and a PHY. While more pins may be added to a chip, costs (e.g., in terms of one or more of money, time, and physical space, without limitation) increase proportional to a number of pins and/or interconnects among devices, and it is desirable to limit costs. Signaling could also be changed, however such changes should be performed with care because complying with interface specifications is an important way to promote interoperability and predictability of Ethernet devices, including PHY devices and link layer devices.

In the case of a typical PHY for interfacing a link layer and a shared bus, a receive datapath (circuitry for moving receive data from the shared bus to a link layer), typically operates in a different clock domain than a transmit datapath (the circuitry for moving transmit data from the link layer to a shared bus) and the interfaces that operatively couple the PHY and the link layer. As a non-limiting example, in the case of a 10SPE PHY, a receive datapath is in a remote clock domain, that is, the clock domain of the remote clock of the remote device that sent the receive data. The remote clock is recovered from the receive data and provided across an interface with the receive data to the MAC. The receive data is not synchronized to a new clock domain until it is sent across an interface to the link layer where it is synchronized to the clock domain of a MAC. Meanwhile, a transmit datapath and interfaces operate in a local clock domain, that is, the clock domain of the local clock of the PHY.

As mentioned above, to implement a different clock domain for a transmit datapath and a receive datapath, a PHY provides two reference clocks the link layer, a receive reference clock for the clock domain of the receive datapath (e.g., RX_CLK), and a transmit reference clock for the clock domain of the transmit datapath (e.g., TX_CLK). A MAC, for example, may use the receive reference clock to synchronize receive data frames to its clock domain, and use the transmit reference clock to synchronize transmit data frames to a PHY's local clock domain.

Prior to a desire to implement media access tuning at a PHY, drawbacks, if any, to having a receive datapath and a transmit datapath that operate on different clock domains typically did not outweigh drawbacks of adding circuitry for domain crossing to the receive path (e.g., cost, power, design issues with timing, without limitation). However, the inventors of this disclosure appreciate that having a common clock domain for a PHY side receive datapath and a PHY side transmit datapath would free one or more pins for signaling, including, without limitation, for media access tuning or additional control datapath.

One or more embodiments relate, generally, to operating a PHY side receive datapath and a PHY side transmit datapath in a same clock domain. In one embodiment, a PHY side receive datapath may include synchronization circuitry, and the synchronization circuitry may be configured to enable domain crossing at the receive datapath from a second clock domain (e.g., a remote clock domain) to a first clock domain (e.g., a local clock domain). A transmit datapath and interfaces operatively coupling a PHY to a link layer may also operate in the same clock domain (e.g., the first clock domain).

One or more embodiments relate, generally, to a network protocol stack of node of a multi-drop network segment that implements a control datapath between devices and/or functions of the network protocol stack and a PHY. In one embodiment, the PHY may include one or more pins for sending and/or receiving control data over the control datapath. In one embodiment, the control data may be for implementing aspects of media access tuning at the PHY. In another embodiment, the control data may be for filtering types of Ethernet packets (e.g., using the information in a type field of a standard Ethernet packet, without limitation).

FIG. 1 shows a functional block diagram of a network segment 100 including a link layer device, MAC 104 and a physical layer (PHY) device, PHY 102. As non-limiting examples, network segment 100 may be a segment of a multi-drop network, a segment of a multi-drop sub-network, a multi-drop bus that is a segment of a mixed media network, or a combination or sub-combination thereof. As non-limiting examples, network segment 100 may be, be part of, or include one or more of a microcontroller-type embedded system, a user-type computer, a computer server, a notebook computer, a tablet, a handheld device, a mobile device, a wireless earbud device or headphone device, a wired earbud or headphone device, an appliance sub-system, lighting sub-system, sound sub-system, building control systems, residential monitoring system (e.g., for security or utility usage, without limitation) system, elevator system or sub-system, public transit control system (e.g., for above ground train, below ground train, trolley, or bus, without limitation), an automobile system or automobile sub-system, or an industrial control system, without limitation.

PHY 102 is configured, generally, to interface with MAC 104. As non-limiting examples, PHY 102 and/or MAC 104 may be chip packages including memory and/or logic configured for carrying out all or portions of embodiments described herein. As non-limiting examples, PHY 102 and MAC 104, respectively, may be implemented as separate chip packages or circuitry (e.g., integrated circuits) in a single chip package (e.g., a system-in-a-package (SIP)).

PHY 102 is configured, generally, to interface with shared transmission medium 108, a physical medium that is a communication path for nodes that are, for example, part of network segment 100 or a network of which network segment 100 is a part, including nodes that include a respective PHY 102 and MAC 104. As a non-limiting example, shared transmission medium 108 may be a single twisted pair such as used for single pair Ethernet.

In one or more embodiments, PHY 102 is configured to perform media access tuning. In one or more embodiments, MAC 104 is configured to be traffic aware, and more specifically, is configured to implement collision detection and/or avoidance protocols. In one embodiment, MAC 104 is configured to perform carrier-sense multiple access (CSMA). More specifically, MAC 104 is configured to check for a carrier on shared transmission medium 108, and if it detects a carrier then it waits until no carrier is detected (i.e., the channel is idle) before beginning data transmission.

In the embodiment shown in FIG. 1, network segment 100 also includes one or more other functions 106. Other functions 106 may be, as non-limiting examples, functions of a Link layer or other layers of a Network protocol stack, devices that implement one or more layers of a network protocol stack, or devices that are part of sub-System.

Figure 2:
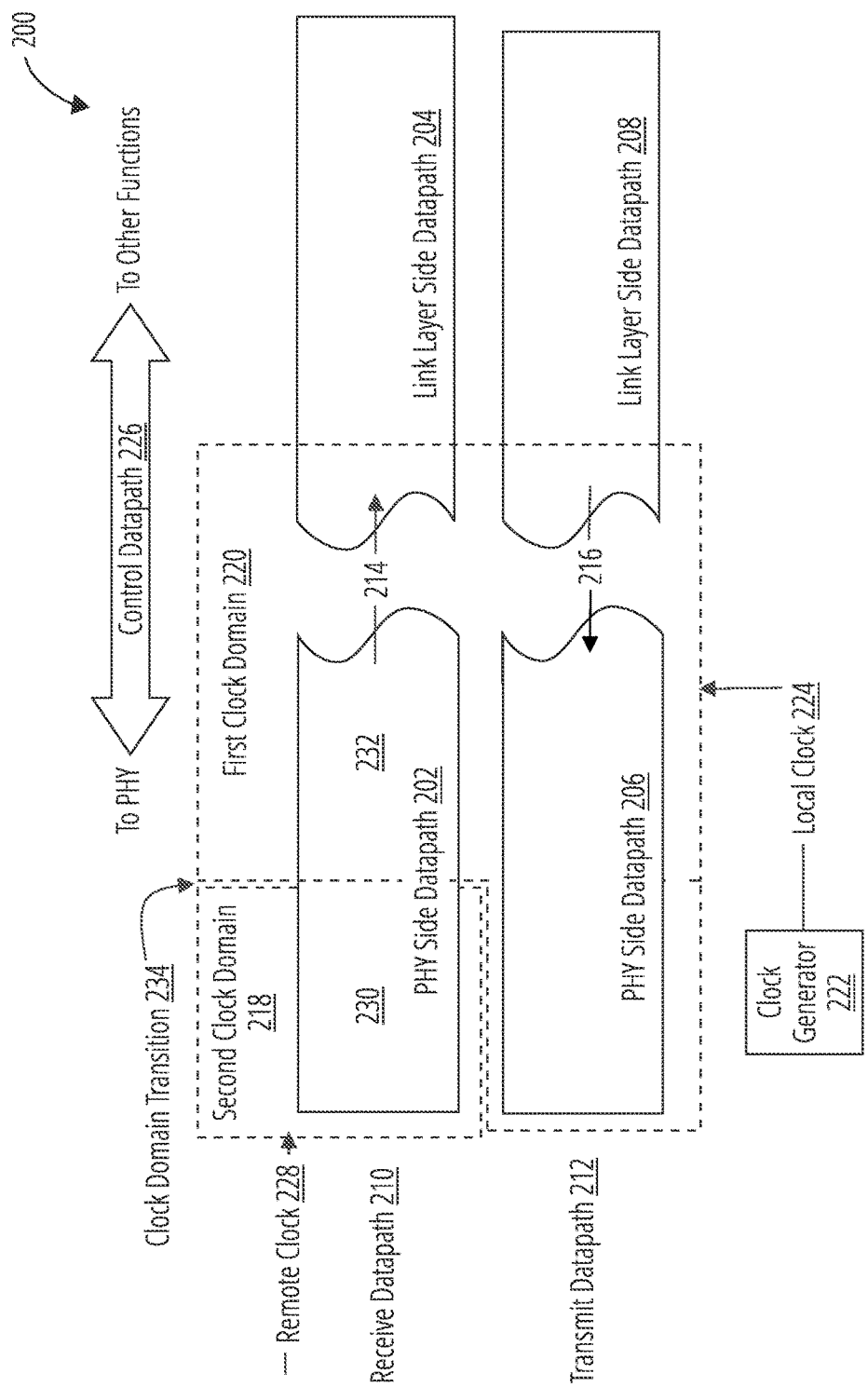
FIG. 2 illustrates a block diagram of a system implementing common clock interfacing in accordance with one or more embodiments.

FIG. 2 is a block diagram of a system 200 implementing a common clock for a receive datapath and a transmit datapath, in accordance with one or more embodiments. System 200 may include a receive datapath 210 and a transmit datapath 212.

In the embodiment of FIG. 2, system 200 includes at least two clock domains, a first clock domain 220, and a second clock domain 218. First clock domain 220 corresponds to a clock rate of a local clock 224 generated at, e.g., PHY 102 of FIG. 1. Second clock domain 218 corresponds to a clock rate of a remote clock 228, e.g., a clock rate of a node other than a node that includes system 200.

For receive datapath 210, a second portion 232 of a PHY side of datapath 202 and a PHY side datapath 206 are in a same clock domain, here, clock first clock domain 220. First interface 214 operatively couples PHY side of datapath 202 to link layer side datapath 204, and second interface 216 operatively couples link layer side datapath 208 to PHY side datapath 206. First interface 214 and second interface 216 are also in first clock domain 220.

A first portion 230 of PHY side of datapath 202 is in second clock domain 218. In the embodiment of FIG. 2, second clock domain 218 may be a remote clock domain associated with remote clock 228. As a non-limiting example, remote clock 228 represents a clock used at a remote PHY of a remote node that sent receive data that is on receive datapath 210. As discussed herein, remote clock 228 is not necessarily recovered at system 200 or system 300.

Clock domain transition 234 is present between first portions 230 and second portion 232 of PHY side of datapath 202, and is a clock domain crossing at PHY side of datapath 202 from second clock domain 218 to first clock domain 220.

In various embodiments, link layer side datapath 204 and link layer side datapath 208 may be in a clock domain that is the same or different than first clock domain 220.

As noted, above, in one or more embodiments, system 200 may include clock generator 222. In one embodiment, clock generator 222 is configured to provide local clock 224 to first clock domain 220, and more specifically, to PHY side of datapath 202 and PHY side datapath 206.

In one or more embodiments, system 200 may include a third datapath, here, control datapath 226 that may operate in first clock domain 220 or another clock domain not shown. Control datapath 226 may be configured to move control data to and from a physical layer, e.g., between PHY 102 and other functions 106 of FIG. 1. In one embodiment, control datapath 226 may be used when executing one or more control cycles at system 200.

In contemplated use cases of disclosed embodiments, respective clock rates of first clock domain 220 and second clock domain 218 may be the same or different clock rates.

Figure 3:
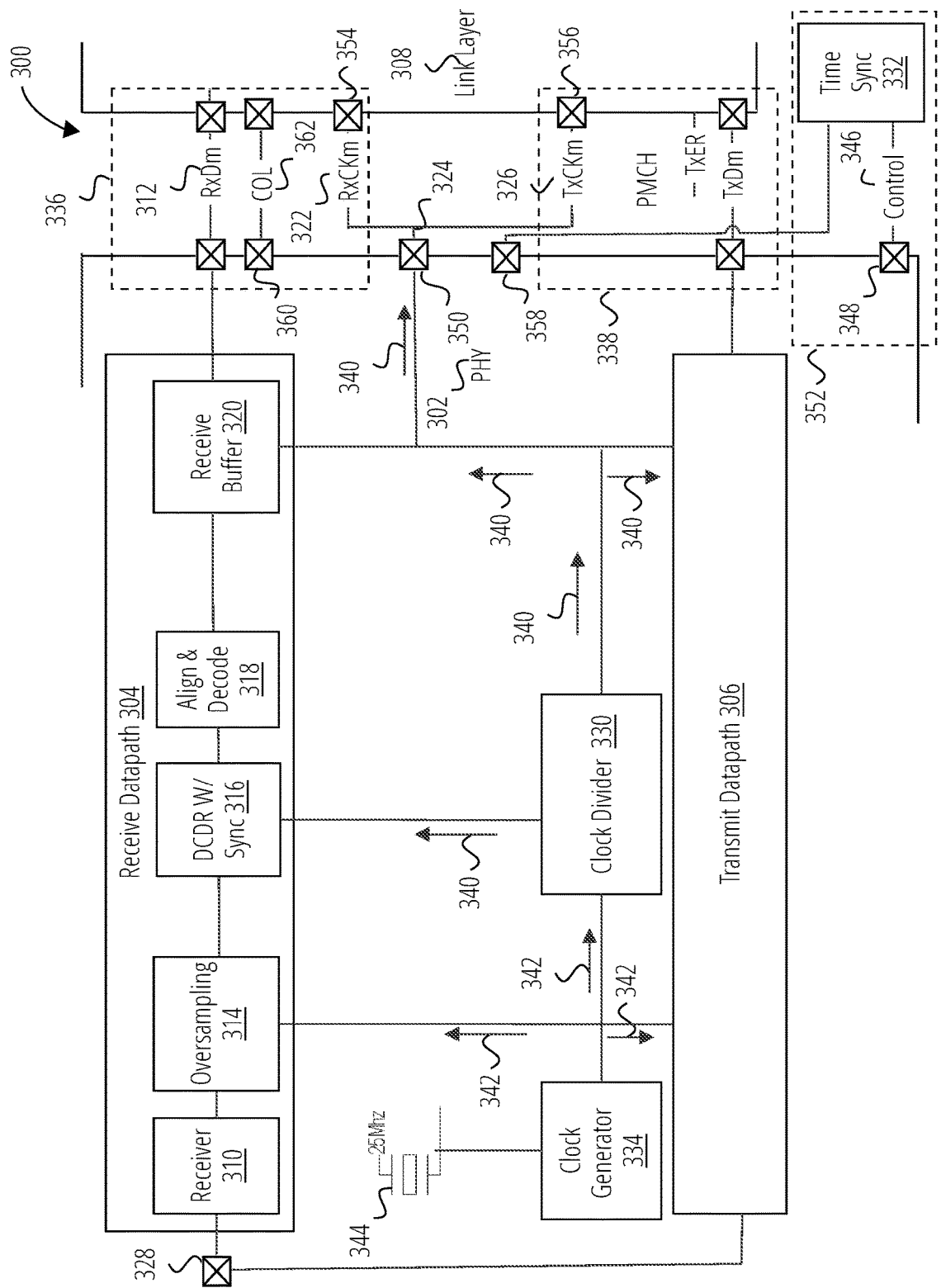
FIG. 3 illustrates a block diagram of an embodiment of a system for implementing a common clock interfacing system such as the system illustrated in FIG. 2.

FIG. 3 shows a block diagram of an embodiment of a system 300 for implementing a receive datapath and a transmit datapath in a same clock domain, for example, in a system 200 of FIG. 2.

In one or more embodiments, system 300 may include PHY 302 and link layer 308. PHY 302 and link layer 308 are operatively coupled by receive interface 336 and transmit interface 338. In one embodiment, receive interface 336 and transmit interface 338 may include pins, interconnects and respective circuitry of PHY 302 and link layer 308 for implementing some or all of a specified interface.

In one embodiment, the specified interface may specify exclusive collision avoidance signaling from PHY 302 to link layer 308 (e.g., an MII interface, without limitation). Exclusive signaling is signaling used for one special purpose (e.g., to indicate specific condition, without limitation), and exclusive collision avoidance signaling is signaling used for a special purpose of indicating a detected collision at a shared transmission medium operatively coupled to interface circuitry 328. In this embodiment, a PHY side and a MAC side of receive interface 336 may each include a respective pin (in the case of the PHY an output and in the case of the MAC an input) assigned for exclusive collision avoidance signaling. PHY 302 may further include circuitry configured for exclusive collision avoidance signaling and link layer 308 may include circuitry for performing collision avoidance using exclusive collision avoidance signaling. In the embodiment of FIG. 3, PHY includes output 360 for exclusive signaling of collision avoidance signals. More specifically, PHY 302 may be configured to generate exclusive collision avoidance signals and provide the signals to link layer 308 by way of output 360 and collision signaling line 362.

In one or more embodiments, PHY 302 may include receive datapath 304, transmit datapath 306, reference clock generator 334, and interface circuitry 328. Interface circuitry 328 is configured to operatively couple PHY 302 to a shared transmission medium (e.g., a shared transmission medium 108), and more specifically, configured to operatively couple respective receive datapath 304 and transmit datapath 306 to a shared transmission medium. As a non-limiting example, interface circuitry 328 may be a media dependent interface (MDI) configured to operatively couple to a single pair Ethernet type cable.

Receive datapath 304 may be configured, generally, to move receive data from a shared transmission medium to a link layer, and may include circuitry for moving receive data at PHY 302 toward link layer 308. Transmit datapath 306 may be configured, generally, to move transmit data from a link layer to a shared transmission medium, and may include circuitry for moving transmit data at PHY 302 away from link layer 308.

In one or more embodiments, receive datapath 304 may include receiver 310, oversampling 314, digital clock and data recovery (DCDR) with synchronization (sync) (i.e., DCDR w/Sync 316), align & decode 318 and receive buffer 320.

In a case of a data reception, an analog input data stream is received at receiver 310 and then oversampled by oversampling 314. A sampling rate of oversampling 314 may be based, at least in part, on local reference clock 342 (e.g., using quadrature components generated in response to local reference clock 342, without limitation). In most cases, an approximate rate of an input data stream will be known, so in some embodiments a frequency of a crystal oscillator 344 may be chosen to be a multiple (i.e., an even or an odd multiple) of the frequency of an input data stream.

Oversampled data is provided to DCDR w/Sync 316, which performs digital clock and data recovery as well as synchronizes recovered data (i.e., receive data) to local clock 340. Local clock 340 is generated by clock divider 330, which is configured to receive local reference clock 342 and generate a divided clock responsive to local reference clock 342. Accordingly, a frequency of local reference clock 342 is an integer multiple (even or odd) of a frequency of local clock 340. So, the oversampled data is immediately synchronizeble to local clock 340 (indeed it may be considered rendered synchronized by virtue of a sampling rate that is synchronized to local reference clock 342 and local clock 340) when it is received at DCDR w/Sync 316, and local clock 340 may be used as a recovered clock for receive data recovered from oversampled data by a DCDR of DCDR w/Sync 316. Unaligned receive data is provided to align & decode 318, which is configured to provide recovered data by performing symbol alignment on unaligned receive data provided by DCDR w/Sync 316. Recovered data (i.e., receive data) is stored at receive buffer 320 to await being sent to link layer 308 over receive interface 336.

In one or more embodiments, reference clock generator 334 is configured to generate local reference clock 342 based on a crystal oscillator, here, crystal oscillator 344. In one embodiment, a frequency of crystal oscillator 344 may be chosen to be a multiple (even or odd multiple) of an expected frequency associated with a shared transmission medium coupled to interface circuitry 328. As a non-limiting example, for a twisted single pair type cable used in 10SPE Ethernet the transmission frequency may be 12.5 megahertz, a frequency of crystal oscillator 344 may be 25 megahertz, a frequency of local reference clock 342 may be 5 megahertz and a frequency of local clock 340 may be 2.5 megahertz.

Local reference clock 342 is provided to oversampling 314, which is configured to use local reference clock 342 to oversample the signals comprising receive data that come from a shared transmission medium. In the embodiment shown in FIG. 3, local reference clock 342 is optionally provided to transmit datapath 306 for sending transmit data to a shared transmission medium.

As noted above, clock divider 330 is configured to generate local clock 340 in response to local reference clock 342. In one embodiment, clock divider 330 is configured to divide local reference clock 342 in response to one or more control bits (not shown). In one embodiment, control bits may be one or more bits that set an integer divisor that defines a relationship between local reference clock 342 and local clock 340. In one embodiment, control bits may be set by a user (e.g., programmed using a design interface, without limitation) and/or control bits may be set by a controller, that is, a microcontroller that implements one or more portions of network protocol stack, as a non-limiting example, a link layer.

In one or more embodiments, receive interface 336 may include, among other lines, output 350, receive reference clock line 322, receive data line 312, and receive clock input 354. Moreover, transmit interface 338 may include transmit reference clock line 326 and transmit reference clock input 356. Local clock 340 is provided to receive reference clock line 322 and transmit reference clock line 326 by way of reference clock line 324 and output 350 of receive interface 336. Moreover, local clock 340 is provided to receive clock input 354 and transmit clock input 354 (each inputs for link layer 308) at receive interface 336 and transmit interface 338, respectively. As non-limiting examples, in various embodiments, reference clock line 324 may comprise one or more bond wires or integrated conductors.

Notably, a bit rate of data at receive interface 336 and a bit rate at transmit interface 338 may be the same. Moreover, respective bit rates of receive interface 336 and transmit interface 338 may be the same or slower than is specified in an interface definition implemented by receive interface 336 and transmit interface 336.

In a contemplated use case, an interface implemented by receive interface 336 and transmit interface 338 may specify that PHY 302 should provide a clock for each of a transmit datapath and a receive datapath. Since, in disclosed embodiments, receive interface 336 and transmit interface 338 operate on a common clock, namely, local clock 340, receive reference clock line 322 and transmit reference clock line 326 may be driven by the same line, namely, reference clock line 324. In this example, such an arrangement frees an input at PHY 302—here input 348 and input 358.

In some embodiments, input 348 may be used to implement a control datapath (e.g., for control signaling) between PHY 302 and functions (e.g., other functions 106 of FIG. 1) that are localized (e.g., implemented in devices and/or sub-layers, without limitation) somewhere other than link layer 308. Characterized another way, input 348 may be used to implement a control datapath separate from receive interface 336 and transmit interface 338. In one embodiment, a control datapath may be implemented between PHY 302 and functions that are localized anywhere in a network protocol stack, but not limited to a link layer. In one embodiment, a control datapath may be implemented between PHY 302, and functions and devices that are not part of a network protocol stack, as a non-limiting example, are particular to a type of application (e.g., automotive networks, building networks, transportation control networks, lighting networks, without limitation).

In an embodiment of FIG. 3, input 348 is operatively coupled to time sync 332, which together form part of control datapath 352 usable for control cycles related to media access tuning. Another control datapath is formed, in part, by input 358 and time sync 332. In FIG. 3, input 358 may be part of transmit interface 338 or receive interface 336.

In this case, time sync 332 is configured to generate control signals 346 usable for time synchronization for media access tuning. As a non-limiting example, control signals 346 may include events related to time aware protocols, such as events to indicate the beginning of a scheduled transmit opportunity. As another non-limiting example, control signals 346 may include events related to traffic shaping protocols, such as the beginning of a transmit opportunity for time sensitive data (which is traffic that is regular (e.g., audio frames, sensor polls, without limitation) and deterministic latency is important) or best efforts data (data that is irregular (e.g., firmware updates, audio control signals, without limitation) and latency is not important, but where starvation is to be avoided). In this manner, control signals 346 may be or relate to one or more control cycles of PHY 302, including without limitation, control cycles for time aware protocols, traffic shaping protocols, and physical layer collision avoidance.

One of ordinary skill in the art would recognize many advantages and benefits to the embodiments disclosed herein. As a non-limiting example, control data paths may be added to a PHY architecture suitable for a specified interface, but without adding additional inputs and/or outputs. As non-limiting examples, control paths may be used for communication between PHY and a link layer, a PHY and other locations within a network protocol stack than a link layer, and between a PHY and other devices in a system or sub-system.

Figure 4:
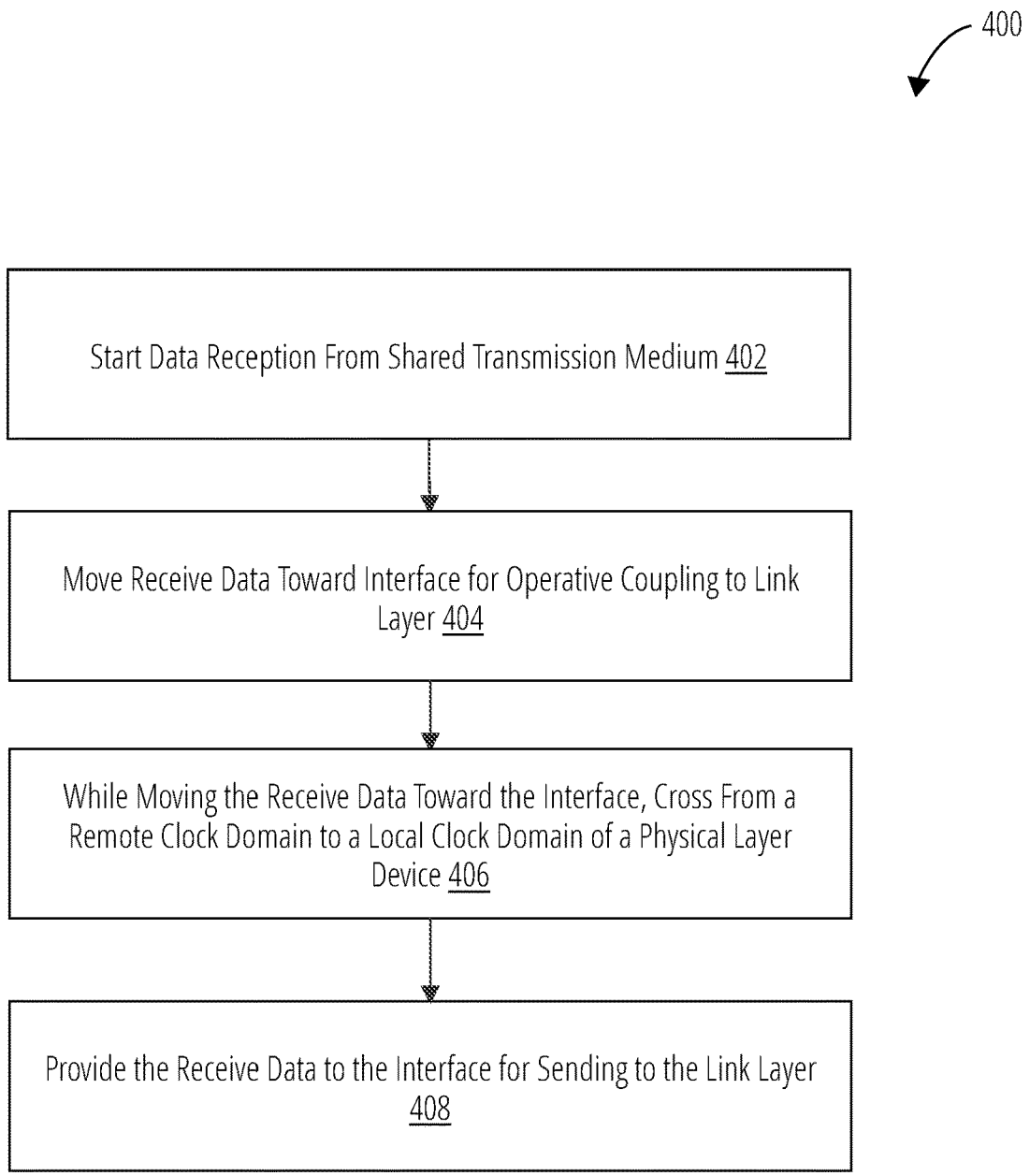
FIG. 4 illustrates a flow chart of a process in accordance with one or more embodiments.

FIG. 4 shows a flowchart of a data reception process 400, in accordance with one or more embodiments. In operation 402, process 400 starts a data reception from a shared transmission medium. The data reception may be performed at a physical layer device such as PHY 102 and PHY 302. In one embodiment, the shared transmission medium is a twisted single pair Ethernet cable, and the physical layer device is configured for 10 Megabit per second communication over the shared transmission medium. In operation 404, process 400 moves receive data toward an interface is configured to operatively couple a physical layer device to a link layer device. In one embodiment, the interface is one that uses exclusive collision avoidance signaling. In one embodiment, the link layer device is a media access control device. While moving the receive data in operation 404, in operation 406, process 400 crosses from a remote clock domain to a local clock domain of a physical layer device. In one embodiment, the receive data crosses to the local clock domain after it is recovered. In another embodiment, the receive data crosses to the local clock domain while it is being recovered. In operation 408, process 400 provides the receive data, now in the local clock domain, to the interface for sending to the link layer.

Any characterization in this disclosure of something as "typical," "conventional," or "known" does not necessarily mean that it is disclosed in the prior art or that the discussed aspects are appreciated in the prior art. Nor does it necessarily mean that, in the relevant field, it is widely known, well-understood, or routinely used.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure include:

Embodiment 1

A system, comprising: a physical layer side receive datapath configured to move receive data a toward a link layer side receive datapath; and a physical layer side transmit datapath configured to move transmit data toward a shared transmission medium, wherein the receive datapath and the transmit datapath are in a first clock domain.

Embodiment 2

The system of Embodiment 1, further comprising a control datapath.

Embodiment 3

The system of any of Embodiments 1 and 2, wherein the control datapath is configured to move control data to or from the physical layer of the system.

Embodiment 4

The system of any of Embodiments 1 through 3, wherein the control datapath is configured to move the control data between the physical layer of the system and an application layer of a network protocol stack.

Embodiment 5

The system of any of Embodiments 1 through 4, wherein the control datapath is configured to move the control data between the physical layer of the system and a device that is separate from a network protocol stack.

Embodiment 6

The system of any of Embodiments 1 through 5, wherein the control datapath may be used for one or more control cycles that comprise moving control data to or from the physical layer.

Embodiment 7

The system of any of Embodiments 1 through 6, wherein one of the one or more control cycles is associated with one of a time aware protocol, a traffic shaping protocol, and a physical layer collision avoidance protocol.

Embodiment 8

The system of any of Embodiments 1 through 7, wherein the physical layer side receive datapath comprises: a first portion that is in a second clock domain; a second portion that is in the first clock domain; and a transition boundary where receive data being moved by the physical layer side receive datapath crosses from the second clock domain to the first clock domain.

Embodiment 9

A circuitry of a physical layer device, comprising: a local clock generator configured to generate a local clock; a receive circuitry and transmit circuitry, wherein each of the receive circuitry and the transmit circuitry are operatively coupled to an output of the local clock generator and configured for clocking by the local clock; and one or more outputs, wherein the one or more outputs comprise a first output operatively coupled to the clock generator and configured to propagate the local clock.

Embodiment 10

The circuitry of Embodiment 9, a local reference clock generator operatively coupled to an output of the local clock generator and configured to generate a local reference clock responsive to the local clock. Further, wherein the local clock generator is operatively coupled to an output of the local reference clock generator and configured to generate the local clock responsive to the local reference clock.

Embodiment 11

The circuitry of any of Embodiments 9 and 10, further comprising an interconnect, the interconnect configured to operably couple the first output to a receive clock input of a link layer device and to a transmit clock input of the link layer device.

Embodiment 12

The circuitry of any of Embodiments 9 through 11, wherein the one or more outputs comprise a second output, the second output assigned to a signal for exclusive collision signaling.

Embodiment 13

The circuitry of any of Embodiments 9 through 12, further comprising one or more inputs, wherein the one or more inputs comprise a first input operatively coupled to the transmit circuitry, wherein the first input is assigned to a signal for control signaling.

Embodiment 14

The circuitry of any of Embodiments 9 through 13, further comprising an interconnect, the interconnect configured to operably couple the first input to one or more devices above a link layer of a network protocol stack.

Embodiment 15

The circuitry of any of Embodiments 9 through 14, further comprising interface circuitry for operable coupling to a shared transmission medium.

Embodiment 16

The circuitry of any of Embodiments 9 through 15, wherein one of the one or more devices is a time syncing circuit.

Embodiment 17

The circuitry of any of Embodiments 9 through 16, wherein at least one output of the one or more outputs is configured for exclusive collision signaling.

Embodiment 18

The circuitry of any of Embodiments 9 through 17, further comprising an interconnect, the interconnect configured to operatively couple the at least one out for exclusive collision signaling to an input of a link layer device for exclusive collision signaling.

Embodiment 19

The circuitry of any of Embodiments 9 through 18, further comprising a second clock generator configured to generate a local reference clock.

Embodiment 20

The circuitry of any of Embodiments 9 through 19, wherein the local clock generator is configured to generate the local clock responsive to the local reference clock.

Embodiment 21

The circuitry of any of Embodiments 9 through 20, wherein the receive circuitry comprises: an oversampling circuit configured to receive the local reference clock; and a synchronization circuit configured to receive the local clock.

Embodiment 22

A method, comprising: starting a data reception from a shared transmission medium; moving receive data toward an interface for operative coupling to a link layer, wherein the moving the receive data comprises crossing the receive data from a remote clock domain to a local clock domain of a physical layer device.

Embodiment 23

The method of Embodiment 22, wherein the moving the receive data further comprises: oversampling data received from the shared transmission medium.

Embodiment 24

The method of any of Embodiments 22 and 23, wherein the moving the receive data further comprises: performing digital clock and data recovery using the oversampled data.

Embodiment 25

The method of any of Embodiments 22 through 24, further comprising: providing the receive data to the interface for sending to the link layer.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:
1. A system, comprising:
 a physical layer side receive datapath circuitry to move receive data toward a link layer side receive datapath circuitry, the physical layer side receive datapath circuitry comprising:
  a first portion coupled to operate according to a first clock domain;
  a second portion coupled to operate according to a second clock domain; and
  a transition boundary where receive data moved via the physical layer side receive datapath circuitry crosses from the second clock domain to the first clock domain; and
 a physical layer side transmit datapath circuitry to move transmit data toward a shared transmission medium, wherein the physical layer side transmit datapath circuitry coupled to move transmit data toward the shared transmission medium according to the first clock domain.

2. The system of claim 1, further comprising a control datapath.

3. The system of claim 2, wherein the control datapath to move control data to or from a physical layer of the system.

4. The system of claim 3, wherein the control datapath to move the control data between the physical layer of the system and an application layer of a network protocol stack.

5. The system of claim 3, wherein the control datapath to move the control data between the physical layer of the system and a device that is separate from a network protocol stack.

6. The system of claim 3, wherein the control datapath may be used for one or more control cycles that comprise moving control data to or from the physical layer.

7. The system of claim 6, wherein one of the one or more control cycles is associated with one of a time aware protocol, a traffic shaping protocol, and a physical layer collision avoidance protocol.

8. A circuitry of a physical layer device, comprising:
a local clock generator to generate a local clock;
a transmit circuitry and a first portion of a receive circuitry, wherein each of the transmit circuitry and the first portion of the receive circuitry are operatively coupled to an output of the local clock generator and are clocked by the local clock, wherein the transmit circuitry to move transmit data toward a shared transmission medium based on the local clock;
a second portion of a receive circuitry coupled to operate according to a remote clock; and
one or more outputs, wherein the one or more outputs comprise a first output operatively coupled to the clock generator to propagate the local clock.

9. The circuitry of claim 8, further comprising an interconnect, the interconnect to operably couple the first output to a receive clock input of a link layer device and to a transmit clock input of the link layer device.

10. The circuitry of claim 8, wherein the one or more outputs comprise a second output, the second output assigned to a signal for exclusive collision signaling.

11. The circuitry of claim 8, further comprising one or more inputs, wherein the one or more inputs comprise a first input operatively coupled to the transmit circuitry, wherein the first input is assigned to a signal for control signaling.

12. The circuitry of claim 11, further comprising an interconnect, the interconnect to operably couple the first input to one or more devices above a link layer of a network protocol stack.

13. The circuitry of claim 12, further comprising interface circuitry for operable coupling to the shared transmission medium.

14. The circuitry of claim 13, wherein one of the one or more devices is a time syncing circuit.

15. The circuitry of claim 8, wherein at least one output of the one or more outputs for exclusive collision signaling.

16. The circuitry of claim 15, further comprising an interconnect, the interconnect is to operatively couple the at least one output for exclusive collision signaling to an input of a link layer device for exclusive collision signaling.

17. The circuitry of claim 8, further comprising a reference clock generator to generate a local reference clock.

18. The circuitry of claim 17, wherein the local clock generator to generate the local clock responsive to the local reference clock.

19. The circuitry of claim 17, wherein the receive circuitry comprises:
an oversampling circuit to receive the local reference clock; and
a synchronization circuit to receive the local clock.

20. A method, comprising:
starting a data reception from a shared transmission medium; and
moving receive data toward an interface for operative coupling to a link layer, wherein the moving the receive data comprises crossing the receive data from a remote clock domain to a local clock domain of a physical layer device, the link layer coupled to operate on the local clock domain of the physical layer device.

21. The method of claim 20, wherein the moving the receive data further comprises:
oversampling data received from the shared transmission medium.

22. The method of claim 21, wherein the moving the receive data further comprises:
performing digital clock and data recovery using the oversampled data.

23. The method of claim 22, further comprising:
providing the receive data to the interface for sending to the link layer.

* * * * *